United States Patent [19]

Sawhill

[11] Patent Number: 4,937,082

[45] Date of Patent: Jun. 26, 1990

[54] THIXOTROPIC FEED SUPPLEMENT SUSPENSIONS

[75] Inventor: J. Wallace Sawhill, Canoga Park, Calif.

[73] Assignee: Pacific Kenyon Corp., Long Beach, Calif.

[21] Appl. No.: 245,807

[22] Filed: Sep. 19, 1988

[51] Int. Cl.$^5$ ............................................. A23K 1/22
[52] U.S. Cl. ....................................... 426/69; 426/72; 426/74; 426/623; 426/630; 426/658; 426/807
[58] Field of Search ..................... 426/69, 72, 73, 74, 426/658, 630, 623, 807

[56] References Cited

U.S. PATENT DOCUMENTS

| | | | |
|---|---|---|---|
| 3,901,976 | 8/1975 | Roth et al. | 426/74 |
| 4,160,041 | 7/1979 | Schroeder et al. | 426/69 |
| 4,267,197 | 5/1981 | Sawhill | 426/648 |

*Primary Examiner*—R. B. Penland
*Attorney, Agent, or Firm*—Plante Strauss Vanderburgh & Connors

[57] ABSTRACT

There is disclosed a stable thixotropic suspension of water insoluble animal feed nutrients in an aqueous feed solution and a method for its preparation. The method comprises forming a liquid gel from an aqueous solution of sugar, protein or mixtures thereof, having a concentration of at least 60° Brix, by adding calcium hyroxide and phosphoric acid or ammonium polyphosphate to the solution. The gel is diluted with water and insoluble feed nutrients such as fat, calcium carbonate, calcium sulfate, etc., or drugs such as monisan are suspended in the diluted gel. Water soluble feed nutrients such as urea, sodium bicarbonate, etc., can also be added.

7 Claims, No Drawings

THIXOTROPIC FEED SUPPLEMENT SUSPENSIONS

BACKGROUND OF THE INVENTION

1. Field of Invention

This invention relates to animal feed supplements and, in particular, to animal feed supplements in suspension containing a substantial quantity of water insoluble nutrients.

2. Brief Statement of the Prior Art

The value of sugar-containing supplements as an energy source in animal diets has been recognized for many years. Phosphates have been added to the supplements as a source of dietary phosphorous; urea has been added to supply non-proteinous nitrogen; and fats have been included, as described in U.S. Pat. No. 2,793,952. Vitamins have been included in these supplements as described in U.S. Pat. No. 2,807,546.

A common practice is to suspend solids in liquid feeds with clays such as attapulgite or bentonite. The clays must be used in large quantities, typically about 2 to 3 weight percent based on the weight of the supplement. Since the clays are inert, the user incurs a substantial cost for transportation and storage of an ingredient having no nutrient value. The clays must also be dispersed in deionized water and slurried in the liquid feed with high shear stirring, which increases manufacturing costs.

U.S. Pat. No. 4,267,197 discloses a method of incorporating a substantial quantity of water insoluble nutrients in the liquid supplements while preserving the desirable liquid properties of the supplement. Examples of suitable water insoluble additives are calcium sources such as calcium carbonate, or calcium sulfate, and monisan, a water insoluble drug additive.

The method used in the aforementioned patent is to gel the molasses by adding ammonium orthophosphate and to add the insoluble solids to the gel. Although the method of this patent has been practiced quite successfully on a commercial scale, there is a considerable resistance to use of ammonium compounds in feed supplements, particularly for dairy applications.

Liquid feed supplements have also been prepared by the addition of water, ammonium polyphosphate and calcium chloride to molasses, as described in U.S. Pat. No. 3,962,484. If the calcium chloride is added to molasses before ammonium polyphosphate, excessive gelling and precipitation will occur, as reported in depth in: "Calcium Chloride in Liquid Feed Supplements" NFIA Counter Oct. 14–16, 1973, pp 115-129, by Grosso et al, the inventors named in the aforementioned patent.

It is also known that solid feed supplements can be obtained by the addition of certain gelling agents to molasses. This practice has resulted in commercial acceptance of "poured chemical blocks". The poured chemical blocks are either soft blocks formulated with lime and phosphoric acid at an acidic pH (3.0 to 6.5) as described in U.S. Pat. Nos. 4,027,043 and 4,160,041, or hard blocks in which the formulation contains substantial amounts of alkaline additives, usually magnesium oxide, as described in U.S. Pat. Nos. 4,431,675; 4,171,385; 4,171,386; and 4,265,916; New Zealand Patent No. 170505; Australian Patent No. 438,073; and U.K. Patent No. 1,356,954. Hard blocks prepared by the methods of the latter patents have pH values from 9.5 to 10.5.

All of the aforementioned supplements have contained appreciable quantities of molasses and minimal quantities of water. The solid supplements have contained sufficient molasses to provide mixtures of 60° Brix or greater. Molasses has also been the major ingredient in the liquid supplements, which have molasses concentrations of 55° Brix or greater.

Molasses is desired to impart palatibility to the supplements. It also has nutritional value as a source of energy. Molasses is often costly and its pricing and availability is controlled by only a few suppliers. Consequently, the animal feed supplement market has been dependent on molasses pricing and supply.

BRIEF STATEMENT OF THE INVENTION

This invention comprises a method for the preparation of a stable, thixotropic gel which is ideally suited for use as an animal feed supplement and which can be used as a carrier for water-soluble feed ingredients, such as sodium carbonate and bicarbonate and water-insoluble feed ingredients such as calcium carbonate, calcium sulfate, cottonseed meal, bone meal, animal or vegetable fat, and water-insoluble drugs such as monensin. The liquid phase of the suspension is a liquid gel of a feed solution in which can be dissolved water-soluble nutrients.

The thixotropic liquid is prepared by adding calcium hydroxide, and phosphoric acid or ammonium polyphosphate to the feed solution to prepare a viscous, aqueous gel. The proportions of these additives is controlled to provide the desired pH of the final product from 3.5 to 9.5. This gel is then diluted with water and is used as a carrier for the aforementioned water insoluble animal feed nutrients by adding the insoluble feed nutrient, in powdered form, or the fat to the gel. The gel will suspend large quantities of the powdered solid nutrient or fat, e.g., up to about 60 weight percent, of the supplement weight. The resulting suspension is stable for prolonged periods of storage and over an extended temperature range. Final products can be obtained having molasses contents fom about 7 to 15 weight percent, corresponding to molasses in water concentrations from 10° to about 45° Brix.

THE FEED SOLUTION

The animal feed supplement is prepared from a commercial aqueous feed solution. Generally, this will be a sugar solution, such as molasses, which will contain from 40 to 85 percent solids with the balance being water. A variety of sugar solutions can be used; however, molasses is a preferred source. The feed solution should be present in the feed supplement at a concentration of from 25 to about 75, preferably from 35 to about 70, weight percent.

The water content of molasses is from 15 to about 30 weight percent, depending on the type of molasses. The molasses can be any sugar containing molasses such as cane or Blackstrap Molasses, beet molasses, converted molasses, wood sugar molasses, hydrosyrup, and the like.

Cane molasses, which is a by-product from the extraction of sucrose from sugar cane, is the most widely available molasses. It is commercially available at a standard 79.5° Brix concentration which has a water content of about 21 weight percent and a sugar content of 50 weight percent. Beet molasses, which is a by-product from the production of sucrose from sugar beets is also available at many locations in this country, particularly in the northern and mid-western states. It is also marketed at a standard 79.5° Brix concentration.

Another sugar solution that can be used is whey, a by-product of the dairy industry. The whey is a dilute solution of lactoalbumin, lactose, some fats, and the soluble inorganics from the parent milk. The whey is condensed and spray dried to a powder or is condensed to about 40 to 60 percent solids, the balance being water, and preserved. A typical analysis is as follows:

TABLE 2

| Composition of a Typical Dried Whey | |
|---|---|
| Protein | 12.0% |
| Fat | 0.7% |
| Lactose | 60.0% |
| Phosphorous | 0.79% |
| Calcium | 0.87% |
| Ash | 9.7% |

A third source of a useful sugar solution is the pulp and paper industry which produces large quantities of by-product lignin sulfonates from wood during the sulfite pulping process. After the separation of lignin, the acidity of the resultant solution is neutralized with an ammonium or alkali metal bisulfite compound or base to form the following organic salts:

Ammonium lignin sulfonate;
Sodium lignin sulfonate; and
Magnesium lignin sulfonate.

A typical analysis of a commercially available ammonium lignin sulfonate solution is as follows:

TABLE 3

| Typical Analysis of Ammonium Lignin Sulfonate | |
|---|---|
| Percent Solids | 50% |
| Specific gravity | 1.237 |
| pH, 10% solution | 3.5 |
| Sugars - expressed as glucose | 16.0% |
| Tannin content | 45.0% |
| Available ammonia | 3.0% |
| Sulfur | 6.0% |
| Ash | 1.0% |

The sugar solution is the energy ingredient of the supplement. Sources of other metabolizable organic values can be used to repace a portion of the sugar solutions. Examples of such other useful energy ingredients sources include condensed and dehydrated molasses solubles which are obtained from the fermentation of molasses to produce chemicals such as ethanol, citric acid, glutamic acid, etc. A material rich in metabolizable values, known as condensed molasses solubles, is obtained by evaporation of the residue from this fermentation. This material can also be dehydrated to dryness and the resultant dry solid is also a useful additive. Another very useful feed solution is a condensed or concentrated fermented corn extract, which is sometimes referred to as corn steep liquor or mazoferm. This material is obtained by concentrating the liquid remaining after steeping corn in an aqueous sulfur dioxide solution and allowing it to ferment. These materials can have from 40 to 100 percent solids and contain, on a dry weight basis, from 1 to 15 percent sugar and contain signivicant contents of protein, e.g., from 5 to about 25 percent.

Any of the aforementioned sugar solutions can be mixed with any other sugar solution, or used alone, to obtain a base solution of from 5 to 30 percent water which is used in the supplement at the aforementioned concentrations. Also, some or all of the sugar solution can be replaced with the aforementioned feed solutions (condensed molasses solubles or corn steep liquor), depending on the amount of natural protein which is desired in the final supplement.

THE GELLING AGENTS

The agents which are used to prepare a liquid gel in the sugar solution are phosphoric acid or ammonium polyphosphate and calcium hydroxide. The calcium hydroxide can be obtained by hydration of lime, or can be obtained as commercially available calcium hydroxide. The gelling agents are used at concentrations sufficient to provide from 0.2 to 2.0 weight percent phosphorus, and from 0.1 to 3.0 weight percent calcium in the final suspension. The gelling agents are added in proportions to provide a pH value to the resulting gel of 3.5 to 9.5 with the specific pH value being selected for the particular application. For suspending only fat, a pH value from 3.0 to 5.5 is desired, as t he acidic property inhibits microbial activity. When limestone flour is to be suspended, the pH should be 7.0 or greater, and when sodium bicarbonate is suspended the pH is preferably 8.0 or above. The preferred proportions of calcium to phosphorus are from 0.17 to 1.5 weight parts Ca/P, or from 0.13 to 1.13 elemental parts Ca/P.

The gelling agents are preferably added in an order which insures that calcium hydroxide is added and dissolved prior to the addition of the phosphoric acid, as it has been found that when calcium hydroxide is added to the sugar solution before the phosphoric acid, the increase in viscosity of the molasses is from 2 to 4 times greater than that observed when the phosphoric acid is added first.

The liquid gel is quite viscous and should be diluted to prepare the supplement. It is convenient to dilute the gel before the addition of the insoluble nutrient, however, the dilution could be made simultaneous with addition of the insoluble nutrient. The amount of dilution varies somewhat, depending on the pH of the liquid gel. When the gel has an acid pH (3.5 to 5.5) it should be diluted to a molasses in water concentration of 25° Brix or less. When the pH is neutral (6 to 7.5) it should be diluted to 50° Brix or less, and when the pH is alkaline (8 to 9.5) it should be diluted to 35° Brix or less. The maximum limit of dilution can be determined from the liqud gel viscosity. It should have a stirred viscosity from 900 to 1500 cps and an at-rest viscosity from 3,000 to 5,000 cps. The dilution effectively reduces the molasses content of the supplement to 5 to about 20 weight percent calculated as 79.5 Brix molasses.

POWDERED INSOLUBLE FEED NUTRIENT

The powdered water insoluble nutrient can be any animal feed nutrient which is substantially insoluble in water. Examples of desirable additives that can be suspended in the gelled sugar solution prepared by the invention comprise calcium carbonate, magnesium carbonate, calcium sulphate, or calcium phosphate. All of the aforementioned comprise inorganic nutrients and sources of elements needed for a balanced diet such as calcium, magnesium or phosphorous.

Other water insoluble nutrients in powder form that can be added include those which can supply the animal's protein requirements such as: dried blood or meat meal from rendering plants (which can also serve as a phosphorous source), cottonseed meal, soymeal, dehydrated alfalfa, dried and sterilized animal and poultry manure, fishmeal, powdered egg, and dried fish solubles. The fish solubles is a dried concentrate of the cooking water from a fish cannery which has a very high protein content.

The water insoluble solid animal feed nutrient is added to the gel in powdered form in an amount up to about 55 weight percent of the final supplement. Preferably, the solid is of a size range passing a 20 mesh U.S. standard screen and, most preferably, of a size range passing a 100 mesh standard U.S. screen. The solid can be powdered to any further degree of fineness and the limit on the minimum particle size is controlled only by the economics and cost of finally subdividing the solid material. Typically a size range processing a 100, and retained on a 300, U.S. standard screen can be used.

PROTEIN EQUIVALENT INGREDIENTS

When the feed supplement is intended for consumption by ruminants, a non-protein nitrogen compound such as urea, buiret or mono or di-ammonium phosphate can be used to supply the protein nitrogen dietary requirements of the animals.

Generally, the feed supplement should not contain more than about 40 weight percent equivalent protein content from a protein or non-protein nitrogen compound. When molasses is used as a sugar source, the amount of urea can be reduced by the amount of nitrogen contributed by the molasses. A typical ruminant feed would, therefore, contain from 3 to about 15, preferably from 5 to about 12 weight percent urea as a source of non-protein nitrogen.

THE FAT INGREDIENT

An animal edible fat such as the edible fats and oils from animal and vegetable sources can be used in preparation of the supplement. The supplement prepared by the method of the invention can contain up to about 35 weight percent, based on the supplement weight, of edible fat. Preferably, the composition has from 5 to about 30 weight percent fat. These fats are mono, di or tri-glycerides of various fatty acids such as stearic, palmitic, oleic, linoleic, lauric, etc. Useful fats and oils can also include complex lipids such as the phospholipids, e.g., fatty acid esters of glycerol phosphate or lecithins, which also contain nitrogen bases such as choline. The fats are commonly identified by source, and suitable fats which can be employed include the oils, tailings or residues of the following: soybean oil, cottonseed oil, sesame oil, olive oil, corn oil, tallow, fish oil, coconut oil, palm oil, etc. Preferably, relatively inexpensive sources of fats are employed such as the yellow grease compositions which are reclaimed restaurant fats and greases, acidulated soap stocks or acidulated fats and oils.

Solid animal edible fats are the mostly widely available and are preferred. These fats have melting points in excess of ambient temperatures, i.e., in excess of 65–80° F. The solid fat is heated sufficiently to melt the fat and the resultant, hot fat liquid is then added to the viscous gel which is also warmed to the fat melting temperature, while stirring the mixture sufficiently to disperse the fat intimately through the viscous gel carrier. No emulsifying or stabilization agent is necessary, for if the fat is adequately dispersed into the liquid gel carrier, the fat subdivides into small particles which solidify and form a suspension in the viscous liquid carrier.

Acidulated fats, which can have free fatty acid contents of 40% to 70% can also be used. These fats are often liquid at room temperatures. With high fat content suspensions (those containing over 20% fat) the quantities of water in the supplement must be increased when the fat contains quantities of free fatty acids in excess of 25 weight percent, as these fats tend to increase the viscosity of the final product to a greater extent than do fats with low contents of free fatty acids.

The fat ingredient can also contain an antioxidant in an effective amount to inhibit oxidative degradation of the fat, e.g., from 0.01 to about 1 weight percent butylated hydroxyanisole, butylated hydroxytoluene, 4-hydromethyl-2, 63di-tert-butylphenol, etc.

OTHER FEED INGREDIENTS

Other feed ingredients which can also be added to the supplement include sodium chloride or potassium chloride in an amount from 0.5 to 10 weight percent of the supplement.

In some applications it may be necessary to add microicides such as propionic acid, benzoic acid, or sodium bisulfite to stabilize the supplement against bacteria and yeasts. In those applications, propionic acid at a concentration of 0.1 to 0.5 weight percent, or sodium bisulfite at a concentration of 0.5 to 1.0 weight percent, are effective in preventing growth and development of bacteria and mold.

The content of minerals, as well as other ingredients such as drugs, vitamins, etc., can be varied as desired for specific applications. Examples of various minerals are manganese, iodine, zinc, copper, cobalt and iron compounds. In some specific applications, a high content mineral supplement is desirable, e.g., containing from 6 to 10 percent phosphorus, 5 to 8 percent calcium and from 0.1 to 2 percent of mineral salts, added as finely divided powders. These salts can be water insoluble salts such as dicalcium and tricalcium phosphate or can be water soluble salts such as monoammonium phosphate. Examples of vitamins include Vitamin A, Vitamin D, and Vitamin E.

Examples of useful drugs are: growth promoting food additives or drugs such as monensin and sodium monensin, commercially available under the designation Rumensin from Eli Lilly Co.; chlorotetracyline and sulfamethiazine; and mixtures of chlorotetracyline and sulfamethiazine; etc. Other useful drugs include antibloat and antihelmintic agents as well as insect control agents. The aforementioned materials are used in effective concentrations for the desired result, e.g., drugs are used at concentrations from 0.5 to about 1.0 weight percent. The minerals are usually used in similar concentrations, but are often expressed in amounts from 3 to about 500 milligrams per pound and vitamins are frequently expressed from 10 to about 50,000 units per pound.

The invention will be described with reference to the following examples which serve to illustrate the practice of the invention and demonstrate its results.

EXAMPLE 1

A series of laboratory experiments were performed in a one liter laboratory mixer having a stirrer operated at 200 rpm. After each step of addition of ingredients, described below, the resulting mixture was stirred for 5 minutes before proceeding to the next step.

In successive experiments, sufficient quantities of 79.5 Brix cane molasses and water were added to the mixer to provide 600 grams of diluted molasses, with the amounts of water and molasses adjusted to provide molasses concentrations of 60°, 30°, and 15° Brix, corresponding to sugar contents of 37.5, 18.8 and 9.4 weight percent and water contents of 43, 71 and 86 weight percent. Phosphoric acid was next added to the water and molasses mixtures in amounts to provide total phosphorus contents, in successive experiments, of 1 and 0.5 weight percent. A control, to which no phosphoric acid had been added, was prepared for each experiment.

Hydrated lime was prepared by dispersing lime in three weight parts water per weight of lime, and sufficient quantities of the hydrated lime were added to the diluted molasses solutions to raise the pH values of the solutions to 6.

To each of the resulting liquid gels were added: 100 grams vegetable oil feed fats, 100 grams dicalcium phosphate and 100 grams of urea. In each of the experiments, the resulting mixture was stirred for 5 minutes and its viscosity was measured. A sample was removed for storage and sufficient hydrated lime was added to the remainder to raise its pH to a value of 7.0. The mixture was then stirred for 5 minutes, its viscosity was measured, and a sample was removed for storage.

The preceding steps were repeated, for each experiment in succession, to prepare samples at pH values of 8.0 and 9.0.

Samples of equal portions from each of the experiments were held at room temperature and at 125° F. for 24 hours and their viscosities were again measured to determine viscosities prior to and during stirring. The results are reported as "at rest" and "mixed" viscosities, respectively. The mixed viscosity values were obtained after the sample had been gently stirred with a spoon for one minute. The sample was also observed for stability, and if the fat separated, or sediment formed in the sample, these observations were also recorded.

The viscosities were measured on a Brookfield viscosometer with a number 6 spindle at 12 rpm. The viscosity readings were made at the third revolution for each determination. Past experience has determined that best samples for use as feed suspensions and emulsions should have at rest viscosities from 4,000 to 20,000 cp. and stirred viscosities from 1,500 to 4,500 cp.

The results which were obtained are set out in the following tables, in which acceptable values are underlined.

TABLE 1

| | Physical State | | | | | | |
|---|---|---|---|---|---|---|---|
| Phosphorus (%) | 1 | 1 | 1 | 0.5 | 0.5 | 0.5 | 0 |
| Molasses (Brix) | 60 | 30 | 15 | 60 | 30 | 15 | 60 |
| pH 6.0 | gel | gel | gel | gel | gel | liq | liq |
| 7.0 | gel | liq | gel | liq | liq | liq | liq |
| 8.0 | gel | gel | gel | gel | liq | liq | liq |
| 9.0 | gel | liq | liq | liq | liq | liq | liq |

TABLE 2

| | At Rest Viscosities (cps × 10$^3$) | | | | | | |
|---|---|---|---|---|---|---|---|
| Phosphorus (%) | 1 | 1 | 1 | 0.5 | 0.5 | 0.5 | 0 |
| Molasses (Brix) | 60 | 30 | 15 | 60 | 30 | 15 | 60 |
| pH 6.0 | >30 | >30 | >30 | >30 | >30 | _11_ | 10 |
| 7.0 | >30 | _18_ | _14_ | _27_ | _12_ | _20_ | 12 |
| 8.0 | >30 | >30 | >30 | >30 | 3 | _11_ | 17 |
| 9.0 | >30 | _5_ | 3 | _8_ | 3 | _9_ | 7 |

(acceptable values are underlined)

TABLE 3

| | Stirred Viscosities (cps × 10$^3$) | | | | | | |
|---|---|---|---|---|---|---|---|
| Phosphorus (%) | 1 | 1 | 1 | 0.5 | 0.5 | 0.5 | 0 |
| Molasses (Brix) | 60 | 30 | 15 | 60 | 30 | 15 | 60 |
| pH 6.0 | _3_ | >30 | >30 | _3_ | 27 | _4_ | .3 |
| 7.0 | _3_ | _2_ | _7_ | _2_ | _3_ | _4_ | .3 |
| 8.0 | _5_ | >30 | 14 | _2_ | 1 | _4_ | .3 |
| 9.0 | 2 | 1 | 1 | 1 | .3 | 1 | .3 |

(acceptable values are underlined)

The data revealed that the following samples prepared at pH value of 7.0 were useful for the following suspensions:

(a) all 15 Brix sugar contrations at 0.5% phosphorus content; and
(b) 15 and 30 Brix sugar concentrations at 1.0% phosphorus.

The data thus revealed that the use of a limited amount of phosphoric acid (0.5% phosphorus) and dilution of the molasses to 15 Brix provided liquid gels which were useful for suspensions and emulsions at all pH values.

It was also observed that all the samples which contained no phosphoric acid were unsuitable as they all separated upon mixing.

EXAMPLE 2

A series of experiments was performed to evaluate suspensions produced with high dilutions of the gel initially formed from molasses. In the experiments each formulation was tested at pH values of 5, 7, 9 and 10 and with contents of hydrated lime varied to 2, 3 and 5 weight percent. The following base formulations were prepared:

TABLE 4

| Ingredient | 1 | 2 | 3 | 4 | 5 | 6 | 7 |
|---|---|---|---|---|---|---|---|
| Water | 660 | 640 | 600 | 800 | 765 | 685 | 785 |
| Hydrated Lime | 40 | 60 | 100 | 40 | 60 | 100 | 100 |
| Molasses | 220 | 210 | 200 | 115 | 110 | 100 | 0 |
| H$_3$PO$_4$ | 45 | 66 | 115 | 38 | 55 | 100 | 100 |
| Brix | 20 | 20 | 20 | 10 | 10 | 10 | 9 |

The amount of phosphoric acid was varied in the above base formulations to adjust the pH value of each formulation to 10.0. A sample (200 grams) was removed from each base formulation and the pH value of the formulation was adjusted to 9.0. This procedure was repeated in successive increments to obtain four samples from each formulation with pH values of 10, 9, 7 and 5.

The viscosity of each sample was measured when it was first prepared. All the samples were stored at 60° F. for three days and then inspected for pourability, phase separation, and viscosity, at rest and mixed.

All the samples without molasses (base formulation 7) exhibited initial viscosities of 600 cps. which was inadequate for use in suspeding feed ingredients such as limestone flour or fat. The samples having the greatest amounts of gelling agents (5% lime and 11.5 and 10% phosphoric acid) formed gels which were too thick for use. All other samples had initial viscosities within an acceptable range for use (1,000 to 15,000 cps). The measured initial viscosities are reported in the following table:

TABLE 5

| Base formulation: Sample No. (pH) | 1 | 2 | 3 | 4 | 5 | 6 | 7 |
|---|---|---|---|---|---|---|---|
| A (10) | 900 | 6000 | 10800 | 900 | 12000 | 3600 | 600 |
| B (9) | 4200 | 4500 | 15200 | 2700 | 1500 | 10200 | 600 |
| C (7) | 5100 | 11200 | >30000 | 3600 | 15000 | >30000 | |
| D (5) | 12000 | 15000 | >30000 | 600 | 8400 | >30000 | 600 |

When the samples were inspected after storage, it was found that the samples prepared at molasses concentrations of 20° Brix were more consistently acceptable. Phase separation was only observed in sample No. 1D, which had a pH value of 5.0. Samples 2D and 3D, also at pH of 5.0, were observed to be too thick, thereby indicating that the useful pH range for samples prepared at 20° Brix was above 5.0. All of the samples prepared at pH of 7.0 were acceptable, and all samples prepared at pH values of 9.0 and 10.0 were acceptable, except the two samples which were prepared with the minimum quantities of gelling agents (2.0% lime and 3% phosphoric acid).

At the lower molasses concentration (10° Brix) samples 6A and 6B at the high concentration of gelling agents (5.0% lime and 10% phosphoric acid) were acceptable, and sample 6D at pH of 5 and 3 percent lime was also acceptable.

EXAMPLE 3

The experiments were expanded to use cane molasses, wood molasses and whole whey as different sugar solutions. A standard formulation was prepared with all the sugar solutions, as set forth in the following table:

TABLE 6

| Ingredient | Parts by weight |
|---|---|
| Water | 600 |
| Hydrated lime | 80 |
| Sugar Solution | 300 |
| Phosphoric acid | 80 |

The formulations were prepared at pH values of 7 and 10 by adding additional amounts of lime, as needed, to raise the pH of the resulting liquid gel. In all experiments, the water was added last, after formation of the liquid gel.

The following results were obtained:

TABLE 7

| Sugar solution | Viscosity pH 10 | Viscosity pH 7 |
|---|---|---|
| Cane molasses (79.5 Brix) | 2,100 cps | 18,000 cps |
| Wood molasses (66% solids) | 3,600 cps | 10,800 cps |
| Whole whey (50% solids) | 4,500 cps | 19,500 cps |

All the liquid gels were stable and stable suspensions of fat and limestone flour could be prepared at contents of up to 35 weight percent fat or limestone flour or mixtures thereof.

I claim:

1. A method for preparing a stable thixotropic animal feed supplement liquid which consists essentially of:
   (a) incorporating calcium hydroxide in an aqueous sugar solution having at least 60° Brix concentration in an amount sufficient to provide from 0.1 to 3 weight percent calcium in the supplement liquid;
   (b) stirring the resulting mixture sufficiently to thoroughly disperse said calcium hydroxide;
   (c) adding a soluble phosphate selected from the group consisting of ammonium polyphosphate, phosphoric acid and mixtures thereof to the stirred mixture in an amount sufficient to provide from 0.2 to 2.0 weight percent phosphorus in the supplement and form a thixotropic liquid gel;
   (d) proportionating the quantities of calcium hydroxide and phosphate in steps (a) and (c) to control the pH of the supplement from 3.0 to 9.5;
   (e) adding water to the mixture in sufficient quantities to reduce the sugar in water concentration to below 50° Brix; and to provide a stirred viscosity of the gel from 1200 to 3500 cps; and
   (f) adding water insoluble feed ingredients in an amount comprising from 30 to 70 weight percent of the supplement.

2. The method of claim 1 including the step of adding from 1 to 15 weight percent urea to the supplement.

3. The method of claim 1 wherein said water insoluble feed nutrient is limestone flour in an amount from 5 to 35 weight percent of the supplement.

4. The method of claim 1 wherein said water insoluble feed nutrient is fat in an amount from 5 to 35 weight percent of the supplement.

5. The method of claim 4 wherein limestone flour is also added to said supplement in an amount from 5 to 15 weight percent of said supplement.

6. The method of claim 1 including the step of adding from 1 to 12 weight percent salt to said supplement.

7. The method of claim 1 including the step of adding vitamins and trace minerals in amounts from 0.1 to 1 weight percent of said supplement.

* * * * *